United States Patent [19]

Nägele

[11] 4,184,466
[45] Jan. 22, 1980

[54] LINEAR DISPLACEMENT FLOW RATE METER

[75] Inventor: Erwin Nägele, Hessigheim, Fed. Rep. of Germany

[73] Assignee: Robert Bosch GmbH, Stuttgart, Fed. Rep. of Germany

[21] Appl. No.: 822,501

[22] Filed: Aug. 8, 1977

[30] Foreign Application Priority Data

Sep. 24, 1976 [DE] Fed. Rep. of Germany ....... 2642957

[51] Int. Cl.² .................... F02M 39/00; G01F 1/28
[52] U.S. Cl. .................... 123/139 AW; 123/139 BG; 73/228
[58] Field of Search ............. 123/139 AW, 139 BG, 123/140 MP, 119 R; 73/228; 261/50 A; 137/503

[56] References Cited

U.S. PATENT DOCUMENTS

| | | | |
|---|---|---|---|
| 3,823,696 | 7/1974 | Mutschler et al. | 123/139 AW |
| 3,880,125 | 4/1975 | Kammerer et al. | 123/139 AW |
| 4,040,295 | 8/1977 | Romann | 73/228 |
| 4,043,188 | 8/1977 | Stein et al. | 73/228 |

FOREIGN PATENT DOCUMENTS

| | | | |
|---|---|---|---|
| 2529701 | 1/1977 | Fed. Rep. of Germany | 123/139 AW |
| 2557968 | 6/1977 | Fed. Rep. of Germany | 123/139 AW |
| 2307136 | 5/1976 | France | 123/139 AW |

*Primary Examiner*—Charles J. Myhre
*Assistant Examiner*—P. S. Lall
*Attorney, Agent, or Firm*—Edwin E. Greigg

[57] ABSTRACT

A flow rate meter for gaseous media has a pivotable member rotating about a shaft in a conduit carrying the medium. The force of the flowing medium pivots the member against a restoring force. The constriction of the stream generates a counter force which would make the displacement non-linear unless compensated. The compensation is provided by a vane which extends into a pocket of the conduit and defines two chambers which are connected to portions of the conduit upstream and downstream of the pivoting member, respectively. In a particular application, the flow rate meter is located in the induction tube of an internal combustion engine and is provided with fuel flow channels which meter out fuel in proportion to the pivotal displacement and deliver the fuel to the air stream through one or more nozzles.

8 Claims, 4 Drawing Figures

LINEAR DISPLACEMENT FLOW RATE METER

BACKGROUND OF THE INVENTION

The invention relates basically to a flow rate meter. More particularly, the invention relates to an air flow rate meter disposed in the induction tube of an internal combustion engine and includes a movable pivoted element which is displaced by the air flowing through the induction tube in opposition to a restoring force. The relative displacement of the pivoting element becomes a measure of the flow rate through the channel in which the flow rate meter is disposed.

In known flow rate meters of the type described above, the throttling of the air flow causes a vacuum which generates a force that opposes the opening force and thus results in a non-linear measuring characteristic, i.e., the displacement of the measuring element is a non-linear function of the flow rate of the medium. The known apparatus requires other mechanisms to effect linearization of this function.

OBJECT AND SUMMARY OF THE INVENTION

It is thus a principal object of the present invention to provide a flow rate meter of the type described above in which the predominant disadvantage of the prior art is overcome and the characteristic behavior of the flow rate meter is approximately linear.

It is a further object of the invention to provide a flow rate meter adapted for use in an internal combustion engine where the medium which is measured is the air flow rate through the induction tube and wherein the rotary displacement of the measuring element is used to provide a measured quantity of fuel for the internal combustion engine.

The invention will be better understood as well as further objects and advantages thereof become more apparent from the ensuing detailed description of a preferred exemplary embodiment of the invention taken in conjunction with the drawing.

DESCRIPTION OF THE PREFERRED EMBODIMENT

Figure 1:
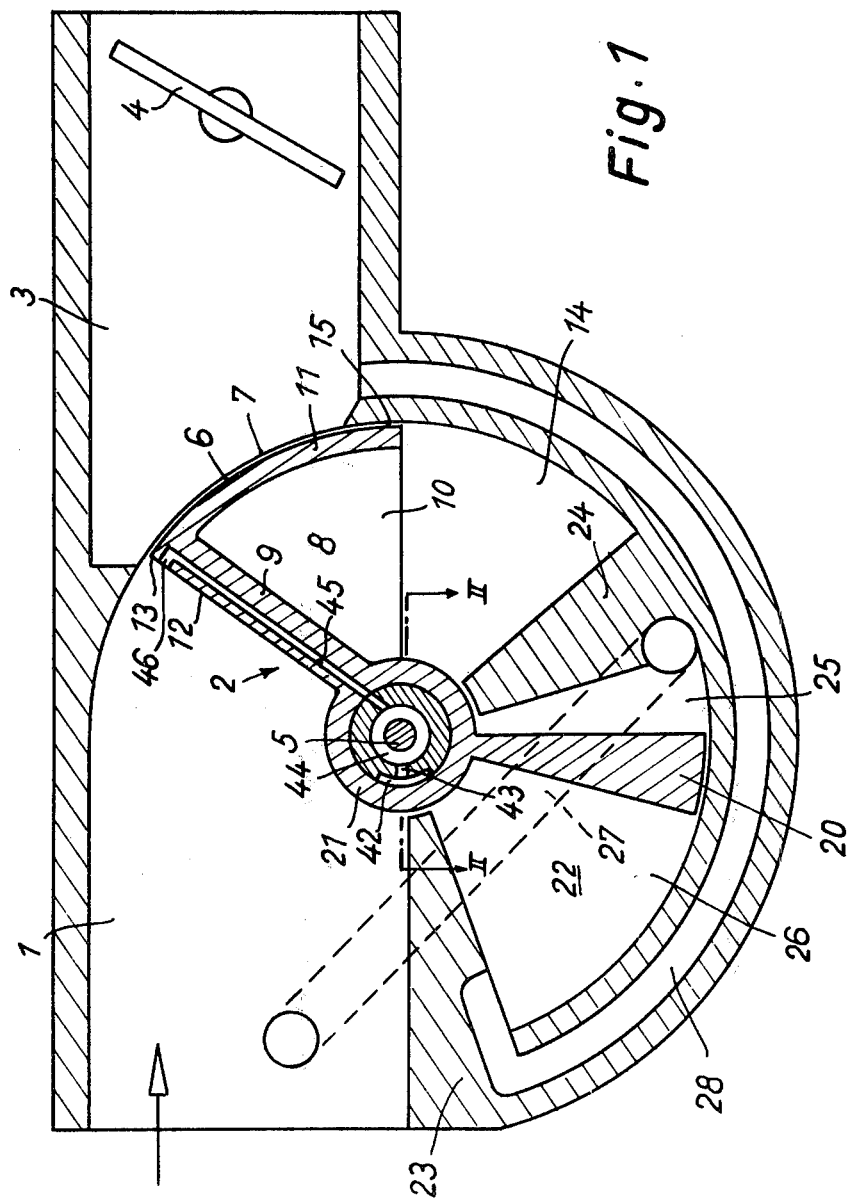
FIG. 1 is an axial section through a portion of a conduit carrying a gaseous medium and through a flow rate meter according to the present invention.

Turning now to FIG. 1, there will be seen a section through a flow rate meter according to the present invention, installed, for example, in the air induction tube of an internal combustion engine for measuring the quantity of air aspirated by the engine. The air flows in the direction of the arrow into a region 1 of the air induction tube which includes the measuring element 2 and then flows through a region 3 of the induction tube containing a freely settable throttle plate 4 and continues to one or more engine cylinders, not shown. The measuring element is mounted pivotably on a fixed shaft 5 which penetrates the induction tube and its shape corresponds substantially to a cylindrical segment which fills the interior of the induction tube with relatively narrow wall clearance. A surface 6 in the shape of a segment of a circle and remote from the axis 5 can obturate an opening 7 downstream of the measuring element 2 in the induction tube. The downstream side of the measuring element is box-shaped and open and defines a cavity 8 by means of a transverse wall 9, lateral walls 10 and a curved cylindrical wall 11 which also defines the surface 6. The face 12 of the element 2 defines a control edge 13 which opens the opening 7 to varying degrees depending on the position of the element and thus depending on the magnitude of the air flow rate through the induction tube. When the measuring element 2 is being displaced by the air stream and opens the opening 7, it enters a damping chamber 14 which communicates via a gap 15 with the induction tube region downstream of the element 2. The gap 15 may be formed by cooperation of the end face of the measuring element and the wall of damping chamber. The air flow through the gap 15 permits the compensation of any pressure pulses in the induction tube and thus do not have any effect on the angular position of the element 2.

Figure 2:
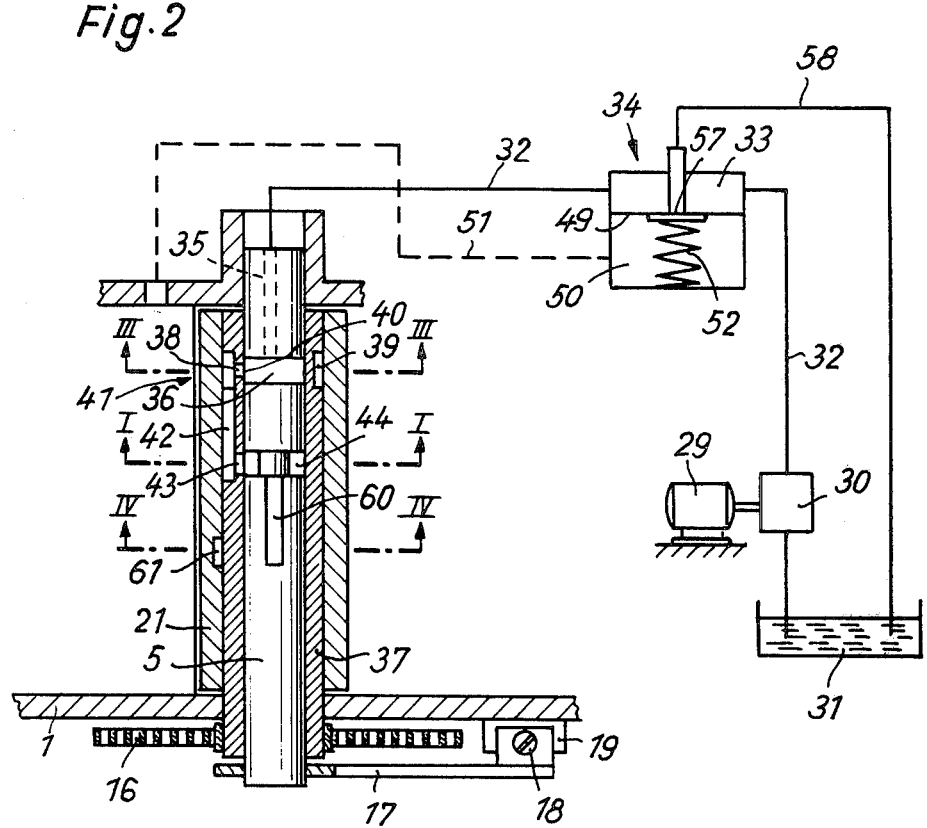
FIG. 2 is a section along the line II—II in FIG. 1.

The displacement of the measuring element 2 by the air stream is opposed by a spiral spring 16, best seen in FIG. 2, one end of which is attached to a bushing 37 coupled to the measuring element 2 and the other end of which is connected to a stop, not shown, attached to the induction tube. If the basic adjustment of the bearing shaft 5 relative to the measuring element 2 must be changed for the purpose of fuel metering, to be described further below, there may be provided an adjustment lever 17 which is coupled to the bearing shaft 5 and which is moved relative to a stop 19 by an adjustment screw 18 (see FIG. 2). As already mentioned the throttling of the air flow through the opening 7 generates a force which opposes the opening force of the element 2 and results in a non-linear measuring characteristic. In order to meet the objects of the present invention and to obtain a linear measuring characteristic, the invention proposes that this force be compensated. According to the exemplary embodiment of the invention, the measuring element 2 is thus provided with a radial vane 20 which is fixedly attached to a hub 21 which is a part of the measuring element 2 and which pivots in a space 22 during the motion of the measuring element 2. A wall 23 limits the space 22 with respect to the induction tube region 1 and a wall 24 limits the space with respect to the damping chamber 14. The vane 20 divides the space 22 into a first chamber 25 lying between the vane and the wall 24 and a second chamber 26 lying between the wall 23 and the vane. The first chamber 25 communicates through a line 27 with the induction tube region 1 upstream of the measuring element 2 while the second chamber 26 communicates through a line 28 with the induction tube region 3 downstream of the measuring element 2. Due to the pressure difference between the chambers 25 and 26, which is equal to the pressure difference across the opening 7, the vane 20 is subjected to a force which acts in the clockwise sense, i.e., in the opening direction of the measuring element 2 whereby the force tending to close the measuring element 2, which is due to the flow throttling, is fully compensated.

Figure 3:
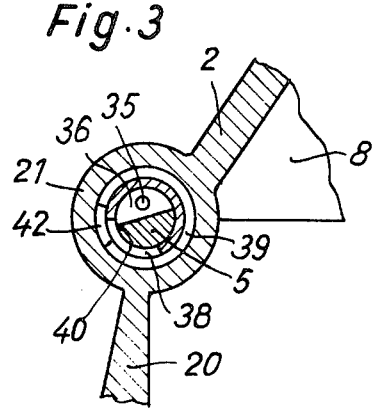
FIG. 3 is a section along the line III—III in FIG. 2.
Figure 4:
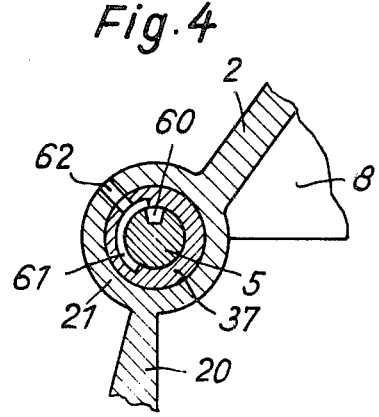
FIG. 4 is a section along the line IV—IV in FIG. 2.

As illustrated in the drawing, the flow rate meter may be a principal part of a fuel injection system and serve for the direct actuation of a fuel metering valve. As illustrated in FIG. 2, fuel is supplied by a fuel pump 30 driven by a motor 29 which pumps fuel from a container 31 through a line 32 into a first chamber 33 of a pressure control valve 34. The fuel then continues to flow through the line 32 into a bore 35, shown dashed, within the bearing shaft 5 which communicates with a groove 36 therein. Inserted by press-fit into the hub 21 on which the measuring element is mounted is a bushing 37 which rotates snugly about the bearing shaft 5. The bushing 37 contains a control slot 38 which terminates in a circumferential groove 39. A control edge 40, best seen in FIG. 3, formed by the limiting surface of the groove 36 on the bearing shaft 5 cooperates with the control slot 38 and defines a flow cross section therethrough of varying size, depending on the position of the measuring element 2. The control edge 40 and the control slot 38 together constitute a fuel metering valve 41 which is thus seen to be substantially confined to the vicinity of the bearing shaft 5. The metered fuel flows from the annular groove 39 through a groove 42 and an opening 43 within the bushing 37 into a further annular groove 44 on the bearing shaft 5. The groove 44 communicates with a conduit 45 within the transverse wall 9 and terminates in the vicinity of the edge 13 in an injection nozzle 46 which preferably directs fuel in the direction opposite to the air flow. The single injection nozzle 46 could naturally be replaced by a plurality of nozzles or an injection slit.

The fuel is metered out by the fuel metering valve 41 under constant pressure difference. This constant pressure difference is maintained by a pressure control valve 34 which includes a diaphragm 49 defining a chamber 50 which receives the air pressure upstream of the measuring element 2 via an air line 51, shown dashed. The chamber 50 thus is held at the same pressure as prevails downstream of the control slot 38. A spring biases the pressure control valve 34 in the direction of closure and the force of the spring 52 might be altered in dependence on operational engine parameters. For example a solenoid, not shown, may be used to engage the spring 52 or an additional force may be exerted in parallel to the spring 52 onto the diaphragm 49. The pressure control valve 34 may be embodied as shown as a flat seat valve in which the diaphragm 49 is the movable valve member which cooperates with a fixed valve seat 57 through which fuel may return to the container 31 via a return line 58.

It has been found to be advantageous to admix air with the fuel prior to injection into the induction tube. The admixture of air is accomplished as illustrated in FIG. 2 by providing communication from the groove 44 through a groove 60 and a further annular groove 61 with an air hole 62 which terminates in the induction tube region 1 upstream of the element 2. The admixture of air with the metered fuel prior to injection into the induction tube results in an improved mixture preparation and the transport of the metered fuel to the nozzle 46 is also improved.

The foregoing relates to a preferred exemplary embodiment of the invention, it being understood that other embodiments and variants thereof are possible within the spirit and scope of the invention.

What is claimed and desired to be secured by Letters Patent of the United States is:

1. A flow rate meter for measuring the flow of a gaseous medium in a conduit, including in combination:
    a shaft, disposed in said conduit transverse with respect to the direction of flow;
    a pivotable element, attached to pivot about said shaft, the pivotal position of said element being a function of the flow rate of said medium; and in which the improvement comprises:
    a lateral space in said conduit adjacent to said element;
    a vane extending from said element into said lateral space, dividing said lateral space into first and second chambers of variable size, said first chamber being disposed on the downstream side of said vane and connected in continuous communication with said conduit upstream of said element to receive pressure from said conduit upstream of said element and said second chamber being disposed on the upstream side of said vane and being connected in continuous communication with said conduit downstream of said element to receive pressure from said conduit downstream of said element; whereby a torque is exerted on said element which acts in the same sense as said flow of gaseous medium.

2. A flow rate meter as defined by claim 1, further comprising:
    means integral with said element for defining, in cooperation with said conduit, an opening for variable size for passage therethrough of said flow of gaseous medium, said variable size being dependent on the pivotal position of said element.

3. A flow rate meter as defined by claim 2, further comprising the improvement that portions of said element enter said lateral space during pivotal motions of said element for purposes of damping the pivotal motion and that a throttling passage is provided between said lateral space and said conduit downstream of said element.

4. A flow rate meter as defined by claim 3, wherein said throttling passage is defined by radial end face portions of said element cooperating with inside wall portions of said lateral space.

5. A flow rate meter as defined by claim 1, wherein said conduit is the air induction tube of an internal combustion engine, and said flow rate meter serves to measure the air aspirated by said engine.

6. A flow rate meter as defined by claim 5, wherein said shaft and portions of said element adjacent to said shaft are configured to cooperate in defining a fuel metering valve for controlling the amount of fuel flowing therethrough.

7. A flow rate meter as defined by claim 6, wherein said element includes means for receiving fuel and for metering said fuel and for expelling said fuel into the air stream from portions of said element remote from said shaft in the vicinity of a side of said opening defined by said element.

8. A flow rate meter as defined by claim 7, wherein said fuel is expelled into the air stream in a direction substantially opposite to the direction of air flow.

* * * * *